United States Patent [19]
Beach et al.

[11] Patent Number: 5,755,826
[45] Date of Patent: May 26, 1998

[54] GOLF CLUB SHAFT AND PROCESS FOR MANUFACTURING SAME

[75] Inventors: Todd Beach, San Diego; Jean-Luc Veux, Carlsbad, both of Calif.

[73] Assignee: Taylor Made Golf Company, Inc., Carlsbad, Calif.

[21] Appl. No.: 651,928

[22] Filed: May 21, 1996

[51] Int. Cl.$^6$ .................................................. A63B 53/10
[52] U.S. Cl. ........................ 473/316; 473/320; 264/257; 264/314
[58] Field of Search ...................... 473/308, 316–323, 473/302, 303, 297, 309, 291, 292; 264/314, 257

[56] References Cited

U.S. PATENT DOCUMENTS

| | | | |
|---|---|---|---|
| Re. 33,735 | 11/1991 | Rumble | 473/323 |
| 1,435,088 | 11/1922 | Smith | 273/75 |
| 1,587,082 | 6/1926 | Mattern | 473/302 |
| 5,277,423 | 1/1994 | Artus | 473/319 |
| 5,294,119 | 3/1994 | Vincent | 473/318 |
| 5,297,791 | 3/1994 | Negishi . | |
| 5,316,299 | 5/1994 | Feche et al. | 473/300 |
| 5,350,556 | 9/1994 | Abe | 264/314 |
| 5,454,563 | 10/1995 | Nagamoto | 473/309 |
| 5,467,984 | 11/1995 | Veux et al. | 473/291 |
| 5,505,492 | 4/1996 | Nelson | 280/819 |

FOREIGN PATENT DOCUMENTS 2250443  6/1992  United Kingdom .

Primary Examiner—Sebastiano Passaniti
Assistant Examiner—Stephen L. Blau
Attorney, Agent, or Firm—Greenblum & Bernstein P.L.C.

[57] ABSTRACT

The invention is directed to a golf club shaft and to a process for manufacturing same. The golf club shaft is made of a fiber- and resin-base composite material, the shaft including, along a part of its length, a neck portion in which a ring is inserted, such ring being made of a material having a density higher than the density of the composite material and the ring having a first end portion and a second end portion each having an inner surface in contact with the surface of the neck portion which flares out gradually up to the ends of the ring. The process includes the steps of positioning a bladder made of an extensible and impervious material on an elongated mandrel; covering the mandrel with fibers impregnated with a resin so as to obtain a wound fibrous complex; fitting the complex with the ring; positioning the complex provided with the ring in a mold whose cavity defines the final shape of the shaft to be produced; and performing the molding operation by heating and by application of a pressurized fluid inside the bladder, in order to form the neck portion against the inner surface of the ring and to obtain the compaction of the complex against the mold cavity outside of the neck portion.

25 Claims, 7 Drawing Sheets

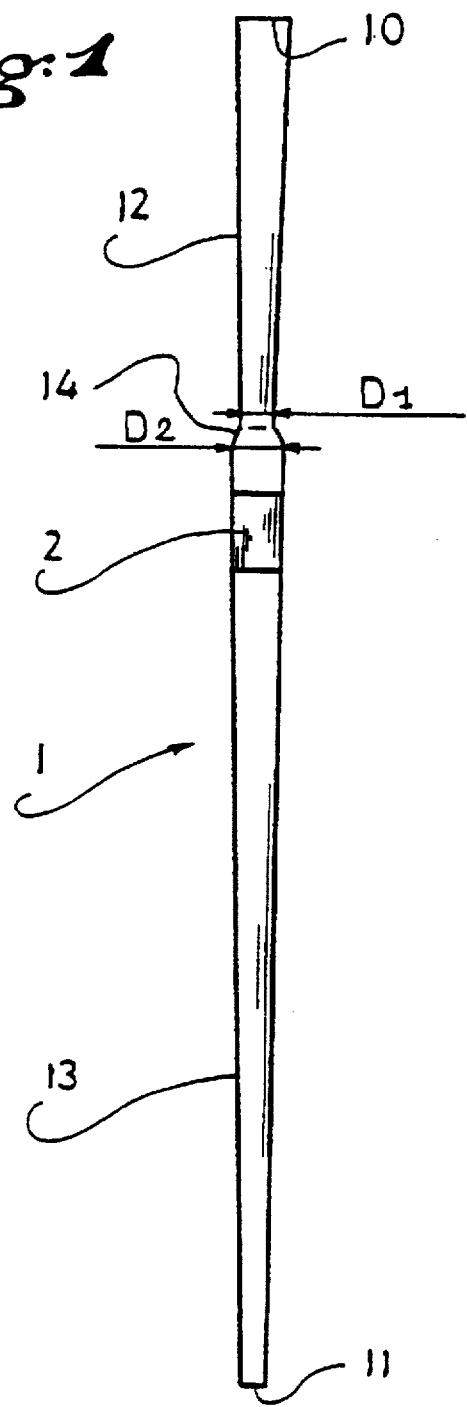

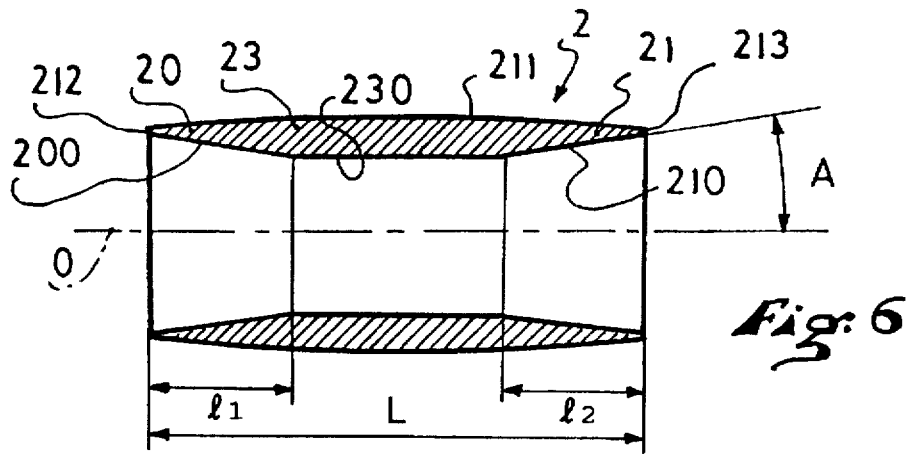
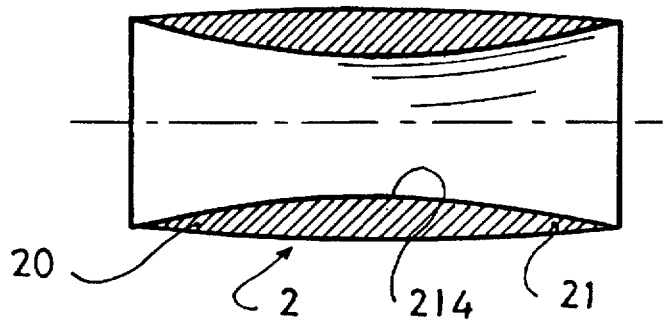
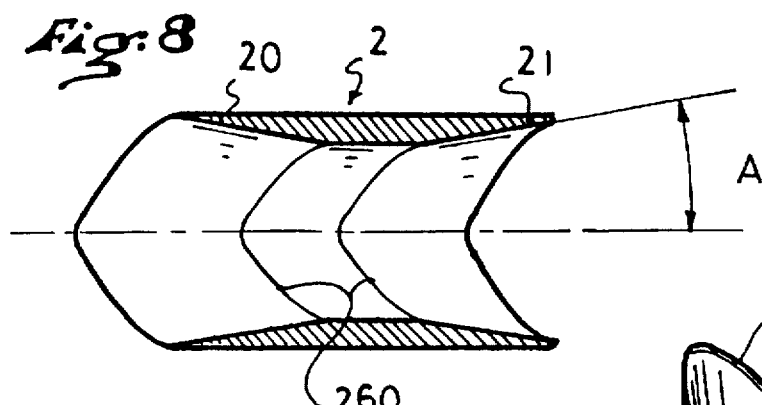
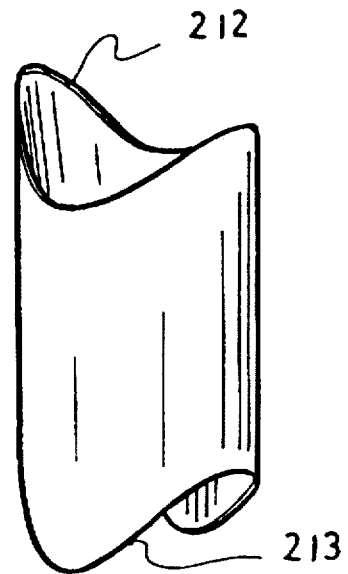

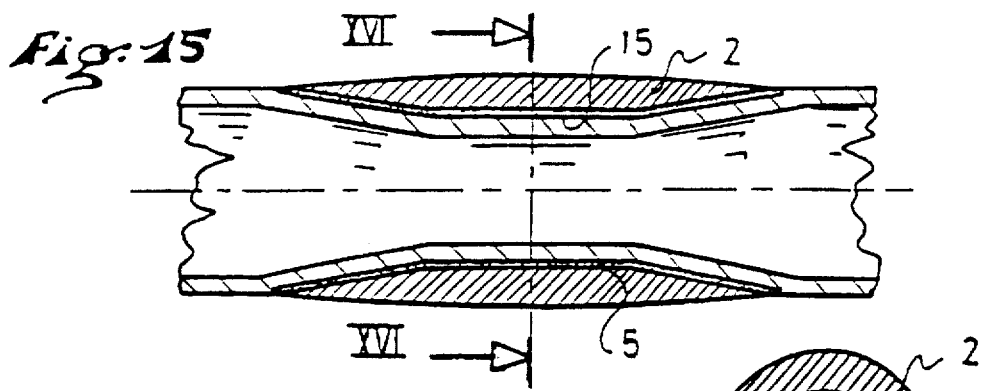
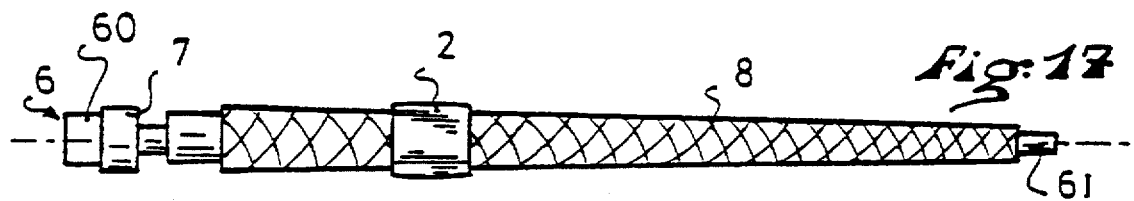
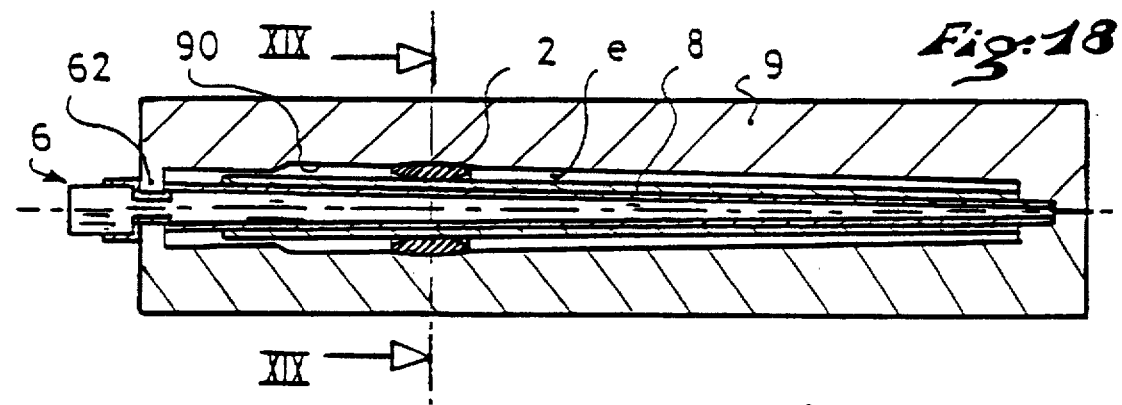
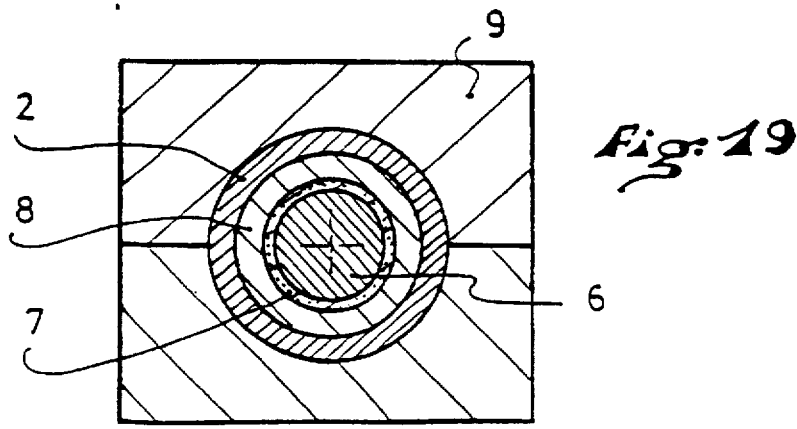

GOLF CLUB SHAFT AND PROCESS FOR MANUFACTURING SAME

BACKGROUND OF THE INVENTION

1. Field of the Invention

The present invention relates to a golf club shaft as well as to the process for manufacturing such a shaft. More particularly, the invention is related to lightened shafts made of composite material and to the problem of their balancing.

2. Description of Background and Relevant Information

Golf club shafts have broadly taken advantage of progress made in the development of composite materials. The current tendency is to make shafts that are increasingly lightweight and conform to desired flexional and torsional stiffness characteristics. The swing motion in striking the ball is a combination of translational and rotational displacements. The reduction in the mass of the shaft makes it easier to displace the club in translation during the swing. In return, it is not easier to displace the club in rotation due to the increase in the ratio inertia/mass of the club caused by a mere reduction of the mass of the shaft.

It is therefore fundamental to establish a dynamic balancing of the entire club to obtain a club that is both lightened and easy to displace during the swing motion.

To this end, U.S. Pat. No. 5,467,984 discloses a golf club with a shaft made out of a composite material, such shaft being balanced in a dynamic fashion by modifying the shape thereof, or by adding a weight in a precise area of the shaft.

The modification of the shape to obtain the balancing comprises modifying the mass distribution of the shaft composite by taking into account stiffness distribution requirements. But this method of a general approach, however, is limited. In comparison, the weight allows for more important possibilities because it consists of restoring the desired balance of the club on a shaft that is lightened and has predetermined stiffness characteristics. It allows also to lower inertia at lower values by concentrating the masses.

U.S. Pat. No. 5,467,984 shows various types of weights in FIGS. 6a–6d. The weight can be arranged as a plug within the shaft, as shown in FIG. 6a. One disadvantage is that it is difficult to precisely control the position of the weight. Another disadvantage comes from the effect of the weight on the shaft stiffness distribution. The embodiment of FIG. 6d concerns the integration of the weight into the inner structure of the composite material. This solution is more particularly suited to the small-scale production of prototypes or clubs, but is not adapted for mass production. It is also very delicate to control the exact position of the mass, and the manufacturer must be extremely meticulous.

In FIG. 6b of the aforementioned patent, which is reproduced hereinafter as an illustration of the prior art, a high density ring is attached and adhered to the outer surface of the shaft. One of the major disadvantages comes from the fact that the longitudinal and rotational displacements of the ring is frequent due to the substantial flexional and torsional stresses to which the shaft is subjected during use, but also to numerous frictions with other clubs in the golf bag during transportation. It must also be noted that the correct positioning of the ring in the desired area is likewise difficult to obtain because it is dependent upon the tolerances related to the dimension and shape of the ring and of the shaft to obtain a coupling with force fit.

FIG. 6c of the prior art patent, which corresponds to FIG. 4 hereinafter, has another solution in which a substantially tubular ring fills a neck portion of the shaft. The advantage is to immobilize the ring with no possibility of displacement within the neck, particularly along the shaft. The problem posed by this solution is essentially linked to the concentrations of the composite stresses which are imposed by the sudden variations in the shaft diameter at the ends of the ring. Tests have shown that these concentrations lead to a substantial risk of breaking the shaft in these zones.

SUMMARY OF THE INVENTION

In view of the prior art, a general object of the invention is to propose a golf club shaft that is lightened but correctly balanced by means of a solution using an additional mass, while avoiding the disadvantages of the known solutions.

Therefore, an object of the invention is more particularly to add a balancing ring to a composite shaft with no possibility of accidental or voluntary displacement of the ring while avoiding any stress concentration in the composite.

Another object is to influence as little as possible the shaft stiffness distribution due to the addition of the ring.

To this end, the invention relates to a golf club shaft made of a fiber- and resin-base composite material including a first end having a large outer diameter, and a second opposing end with a smaller outer diameter. The shaft comprises, along a portion of its length, a neck portion in which a ring is inserted, such ring being made of a material having a density higher than the density of the composite material and said ring having a first end portion and a second end portion each having an inner surface in contact with the surface of the neck portion that flares out gradually up to the ends of the ring.

Due to this geometry of the ring, the stresses that are exerted in the composite are distributed over a more substantial surface, and the risk of rupture is then substantially reduced. Moreover, the variation of the characteristics of flexional stiffness occurs progressively in the neck area.

According to another characteristic of the invention, the neck portion has an outer surface whose shape is complementary to the inner surface of the ring. This shape complementarity promotes the retention and integration of the ring with no possibility of displacement, as well as the distribution of the forces over the entire surface of the ring.

Preferably, the inner surface of each end portion of the ring is substantially truncated and forms an angle of inclination, in relation to the longitudinal axis of the shaft, comprised between 5 and 25 degrees, preferably on the order of 10 degrees.

With this choice of specific values, the stresses are substantially reduced in the composite.

Likewise, it is preferred that the length of each end portion of the ring be comprised between 0.1 and 0.5 times the total length of the ring, for the same reasons as indicated previously.

The invention is also related to the process for obtaining such a shaft insofar as it is particularly adapted therefor.

Thus, the manufacturing process comprises the following steps:

positioning a bladder made of an extensible and impervious material on an elongated mandrel;

covering a mandrel with fibers impregnated with a resin so as to obtain a wound fibrous complex;

fitting the complex with the ring;

positioning the complex provided with the ring in a mold whose cavity defines the final shape of the shaft to be obtained; and performing the molding operation by heating and by application of a pressurized fluid inside the bladder, in order to obtain the formation of the neck portion against the inner surface of the ring and the compaction of the complex against the mold cavity outside of the neck portion.

BRIEF DESCRIPTION OF THE DRAWINGS

Other characteristics and advantages of the invention will be better understood upon reading the description that follows and with reference to the annexed drawings, in which:

FIG. 1 is a side view of a shaft according to the invention;

FIG. 2 is a longitudinal cross-sectional view of the shaft of FIG. 1;

FIG. 6 is a cross-sectional view of a ring according to the invention;

FIG. 7 is a cross-sectional view of a ring according to a variation of the invention;

FIG. 8 is a cross-sectional view of a ring according to another variation of the invention;

FIG. 9 is a side view of the ring of FIG. 8;

FIG. 15 is a longitudinal cross-sectional view of a detail of a shaft according to another variation of the invention;

FIG. 16 is a cross-sectional view along line XVII-13 XVII of FIG. 15;

FIGS. 17-21 show different steps of the process for manufacturing the shaft according to the invention;

FIG. 17 shows a preparation step;

FIG. 18 shows the positioning in the mold before the molding;

FIG. 19 is a view along line XIX—XIX of FIG. 18;

FIG. 20 shows a detail before pressurization; and

FIG. 21 shows the detail of FIG. 20 after pressurization during molding.

DETAILED DESCRIPTION OF THE PREFERRED EMBODIMENTS

Figure 3:
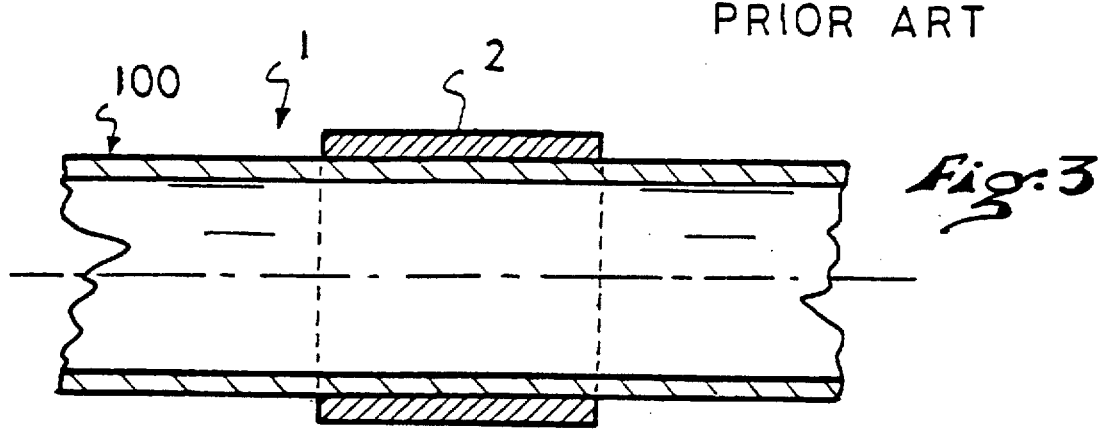
FIG. 3 is a longitudinal detailed cross-sectional view of a shaft from the prior art.

As shown in FIGS. 1 and 2, the shaft 1 according to the invention comprises an elongated member having the shape of a tubular object made out of a fiber- and resin-base composite material, such shaft comprising a large end referred to as "butt" 10 and an end having a smaller outer diameter referred to as "tip" 11.

Between these two ends, the shape of the shaft 1 can be modified as a function of the desired stiffness distribution.

For the example of the invention, a shaft having a particular shape has been chosen which comprises a first truncated upper portion 12 extending from butt 10, a second substantially truncated lower portion 13 ending at tip 11, both portions being connected by a short connection portion 14. The diameter D1 of the lower end of the upper portion 12 is smaller than the diameter D2 of the upper end of the lower portion 13, such that the connection portion is a portion that flares out in the direction of the tip 11. Such a shaft shape and the advantages thereof are described in detail in U.S. Pat. No. 5,316,299, commonly owned herewith.

According to the invention, the shaft is provided with a ring 2 made of a material whose density is greater than the density of the composite material. The ring is located in an appropriate area selected along the shaft as a function of the balancing to be obtained, and it is housed in a neck portion 15 of the shaft. In the example, the ring is located on the second lower portion 13 in the immediate vicinity of the connection portion 14. But the position is, of course, not limiting and can vary along the shaft.

FIG. 3 illustrates one of the solutions of the prior art shown in U.S. Pat. No. 5,467,984. The ring 2 is arranged along the shaft 1 and projects with respect to the outer surface 100 thereof. As explained above, this solution is not satisfactory due to the risk involved in displacing the ring.

Figure 4:
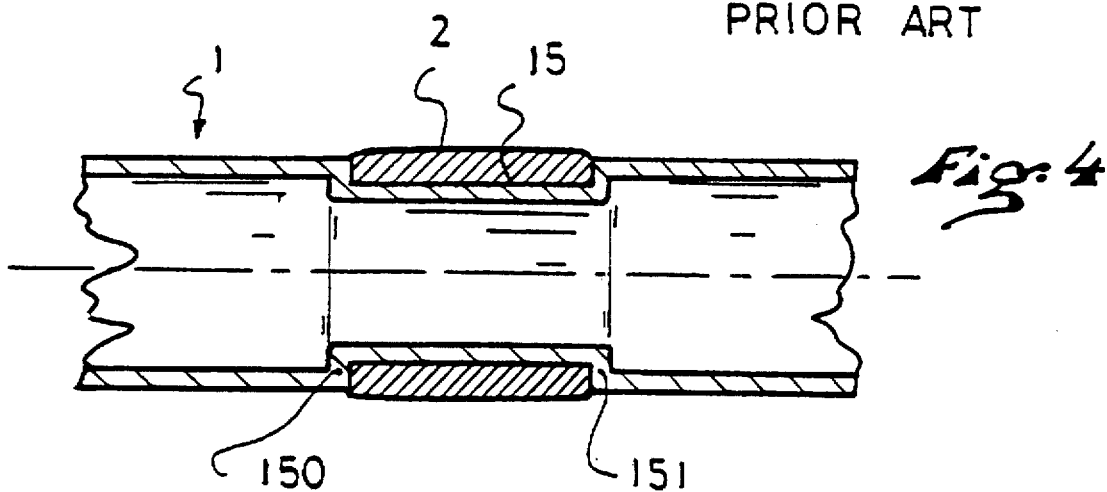
FIG. 4 is a longitudinal detailed cross-sectional view of another shaft from the prior art.

FIG. 4 is another solution disclosed in U.S. Pat. No. 5,467,984 that shows a shaft comprising a neck portion 2 in which the ring 2 is inserted. The circular edges 150 and 151 of the neck portion have a sudden variation in cross section due to the tubular shape of the ring. The fiber of the composite is then bent along large angles in these areas, resulting in the existence of high stress concentrations that render the shaft fragile in these areas.

Figure 5:
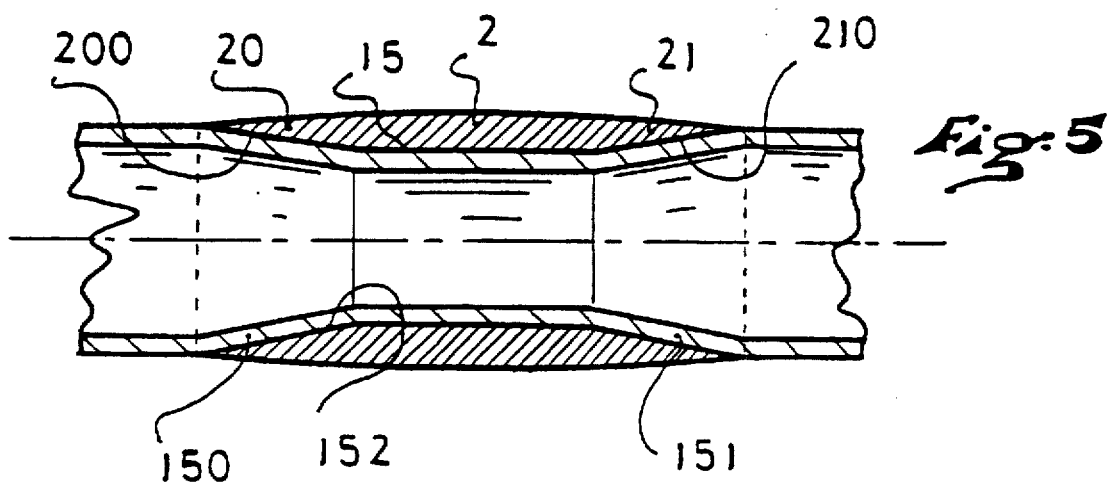
FIG. 5 is a longitudinal detailed cross-sectional view of the shaft of the invention.

In the invention shown in FIG. 5, the ring 2 is inserted in a neck portion 15 of the shaft which comprises a first end portion 20 and a second end portion 21 opposite the first, each having an inner surface 200 and 210 in contact with the surface of the neck portion that flares out gradually, i.e., continuously, up to the ends of the ring. In this way, the edges 150 and 151 of the outer surface 152 of the neck portion comprise flared portions that also flare out progressively from an intermediate area of the neck having the most reduced diameter in the direction of the ends of the shaft so as to considerably lower the stress concentrations in the composition.

FIG. 6 shows an example of the ring according to the invention in which the end portion 20 and 21 of the ring are separated by an intermediate portion 23 whose inner surface 230 is substantially cylindrical.

The inner surface 200, 210 of each end portion of the ring is substantially truncated and forms an angle of inclination A, with respect to the longitudinal axis O of the shaft, comprised between 5 and 25 degrees, preferably on the order of 10 degrees.

In a general manner, the length l1 and l2 of each end portion 20 and 21 of the ring is comprised between 0.1 and 0.5 times the total length L of the ring. The length l1 can also be different from the length l2.

The outer surface 211 of the ring can be more or less curved to provide a greater mass to the ring. In all cases, for a good integration of the ring into the neck, the outer surface 211 of the ring is connected on each side to the inner surfaces 200 and 210 by forming projecting edges 212 and 213 with a sharp angle. Therefore, the transition or joint between the body of the shaft 1 and the ring 2 is generally continuous and not abrupt.

FIG. 7 illustrates another example of the ring with end portions 20 and 21 of the ring that are adjacent and form together a portion having a curved inner surface 214.

Another example of the shape of the ring is proposed in FIGS. 8 and 9.

In particular, the inner surface of the ring is provided with peripheral steps 260 that prevents the displacement of the ring. In addition, the edges 212 and 213 of the ring have a non-circular specific shape with bosses and recesses such that the ring cannot rotate. Incidentally, the shape of the ring can help with the alignment of the club at address.

Figure 10:
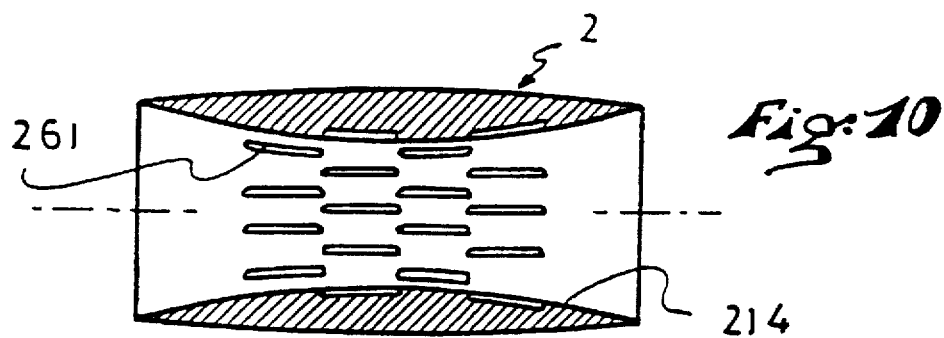
FIG. 10 is a cross-sectional view of a ring according to another variation of the invention.

Likewise, the ring of FIG. 10 comprises an inner surface 214 provided with rows of serrations 261 longitudinally oriented for a similar function. The serration can also be replaced by ribs or pins.

Figure 11:
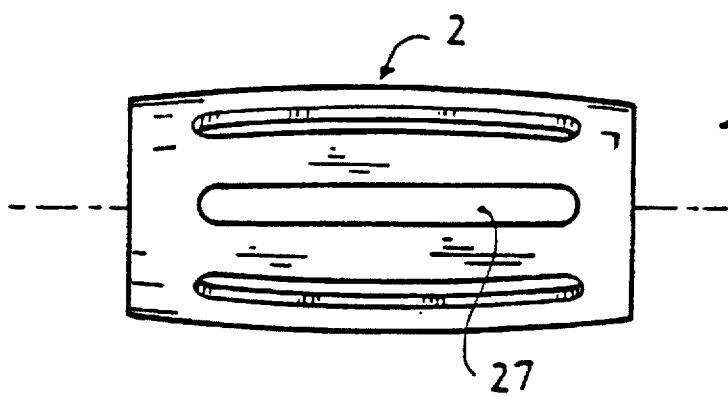
FIG. 11 is a side view of a ring according to another variation.
Figure 12:
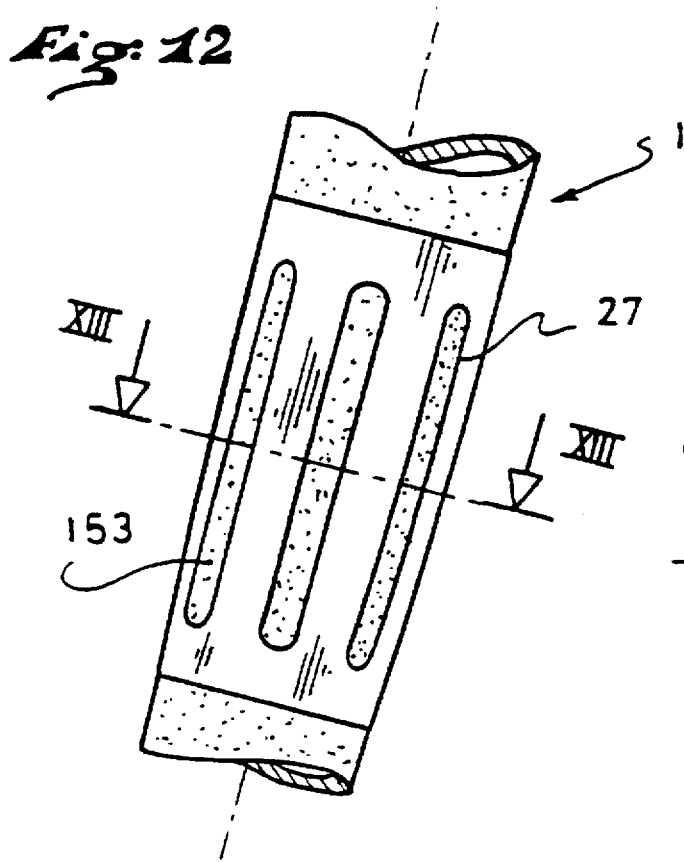
FIG. 12 is a detailed view of a shaft according to the invention with a the ring of FIG. 11.
Figure 13:
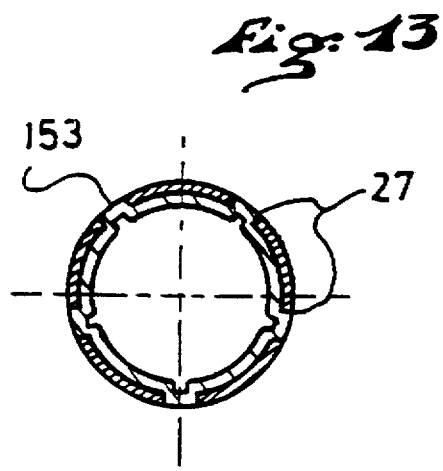
FIG. 13 is a cross-sectional view along line XII—XII of FIG. 12.

The embodiment illustrated in FIGS. 11–13 is related to a ring that has a series of longitudinally oriented and radially spaced flutings 27 that extend through the thickness of the ring. One thus desires to limit the effect of the stiffness of the ring by creating these weakening zones. The flutings 27 also participate in the rotational fixing of the ring in the neck portion. FIG. 13 shows indeed that after molding, composite beads 153 partially cross the flutings 27 and thus prevent the ring from rotating.

Figure 14:
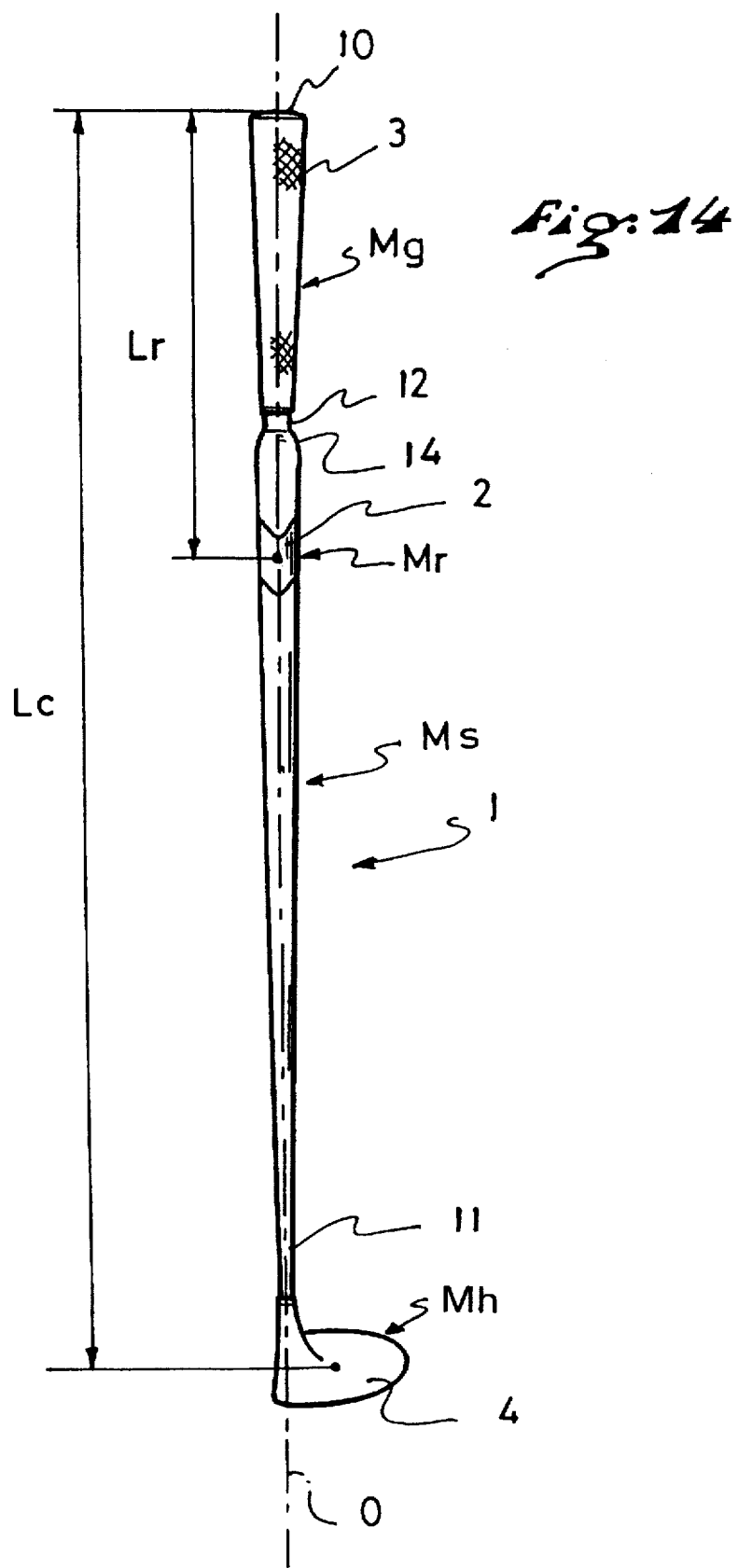
FIG. 14 illustrates a golf club according to the invention.

FIG. 14 shows a golf club after assembly which comprises a shaft 1 of the invention, with a composite mass Ms, to which a head 4 having a mass Mh is attached at tip 11 of the shaft. A grip 3 of mass Mg, extending from the butt 10, covers a part of the upper portion 12. A ring of mass Mr located at a distance Lr from the butt 10 is located on the shaft. By convention, the club has a length Lc considered as the distance separating the butt 10 from the orthogonal projection of the center of gravity of the head on the longitudinal axis of the shaft.

The total mass of the club Mc=Ms+Mr+Mg+Mh.

By way of non-limiting example, one can indicate, for "wood"-type clubs according to the invention, the following ranges of parameter values:

Mc comprised between 240 and 360 g, preferably 300 g.

Ms comprised between 35 and 120 g, preferably 65 g.

Mr comprised between 3 and 40 g, preferably 15 g.

Mg comprised between 5 and 70 g, preferably 20 g.

Mh comprised between 150 and 250 g, preferably 200 g.

Lc comprised between 38 and 50 inches.

Lr comprised between 0.25 and 4 inches.

Likewise, for an iron-type club, the preferred parameters are as follows:

Mc comprised between 300 and 500 g, preferably 380 g.

Ms comprised between 35 and 120 g, preferably 70 g.

Mr comprised between 3 and 40 g, preferably 15 g.

Mg comprised between 5 and 70 g, preferably 20 g.

Mh comprised between 200 and 350 g, preferably 250 g.

Lc comprised between 30 and 45 inches.

Lr comprised between 0.25 and 4 inches.

FIGS. 15 and 16 show another advantageous embodiment of the invention where a weight is combined with a shock absorbing device. In this case, a layer 5 made of flexible material is inserted between the surface of the neck portion 15 and the inner surface of the ring 2. The layer is adhered against both the shaft and the ring by means of an adhesive, if necessary. A self-adhesive material having viscoelastic properties, such as a putty, for example, can also be advantageously selected. The thickness of the layer can be on the order of about 0.2 to 1.5 mm.

Since the ring is rigid, it serves as a retaining plate which, associated with the flexible material layer, acts as a vibration damper on the shaft. Of course, the device must be preferably positioned, in an optimal manner, in the areas where the deformation energy is maximum for the excited modes after the impact.

In all of the embodiments previously described, the ring is selected to be a metallic material, preferably a high density material, selected from among steel, bronze, copper, cupro-beryllium, zinc, brass, aluminum and alloys thereof.

The invention is also related to the manufacturing process that is particularly adapted to the shaft provided with its ring shown in FIGS. 17–21.

Initially, the process comprises providing an elongated mandrel 6 having a length slightly greater than that of the shaft to be produced. The mandrel 6 has a substantially truncated shape with one end having a large cross section 60 and an opposing end having a smaller cross section 61. The mandrel is then covered with a bladder 7 made out of an extensible and impervious material. To obtain a thin bladder in the shape of the mandrel, very good results are obtained in a liquid latex both using a hardening technique.

Lining of the mandrel thus covered is then carried out with resin-impregnated fibers, i.e., a resin/fiber composite material, so as to obtained a wound fibrous complex 8. The most commonly used technique comprises first obtaining a draping of a plurality of fiber laps differently oriented at 0 degrees or inclined at different values in relation to the shaft axis, for example ±45 degrees. According to a variation, the mandrel can also be lined by filament winding.

As shown in FIG. 17, the mandrel is then provided with the ring 2 made of high density material. The complex 8 thus provided with its ring is then placed in a mold 9 whose cavity 90 defines the final shape of the shaft to be obtained. The cavity can have a countershape that is substantially different and more complex than the truncated shape of the mandrel. The mandrel is positioned by preserving a space e between the complex composite structure and the cavity surface. To ensure a constant position of the mandrel in the mold, a shoulder 62 that serves as a positioning reference can be provided.

Figure 20:
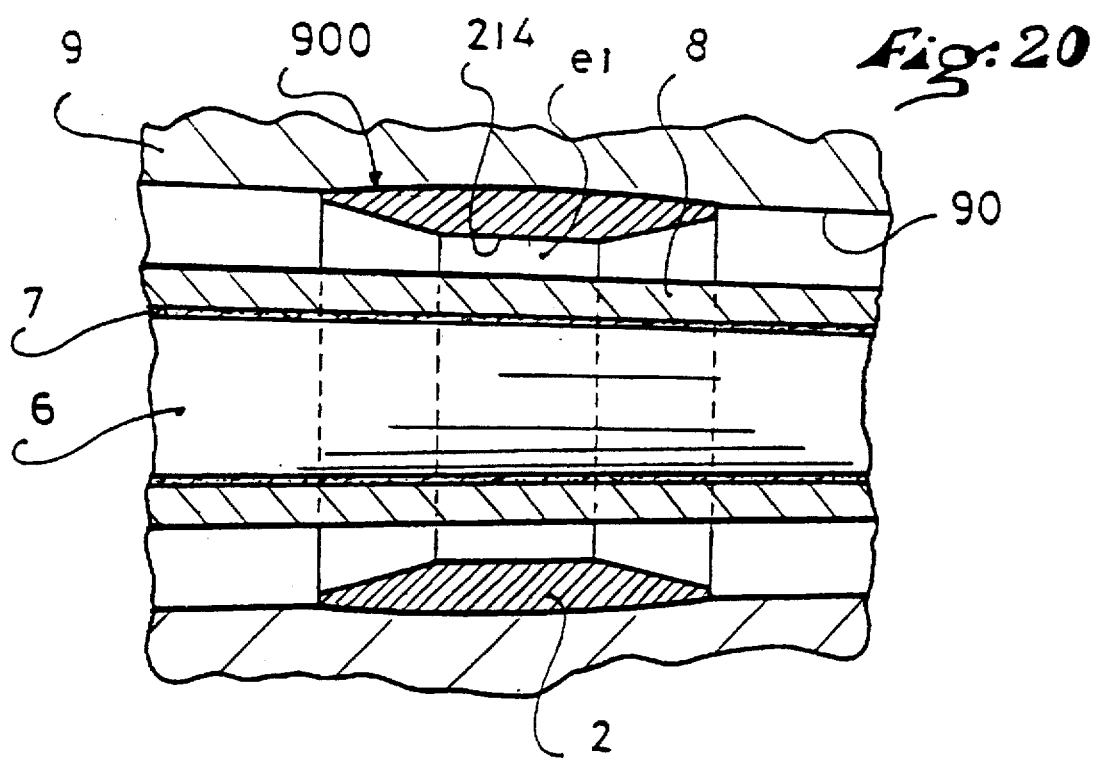

As shown in FIG. 20, the ring is positioned in the mold in contact with the cavity 90. A space e1 then exists between the inner surface 214 of the ring and the surface of the complex 8 before pressure is applied.

Preferably, the cavity 90 includes a concave curved portion 900 having a shape complementary to the shape of the outer surface of the ring, such that the positioning of the ring is made easy by a shape nesting at a marked area in the mold.

Figure 21:
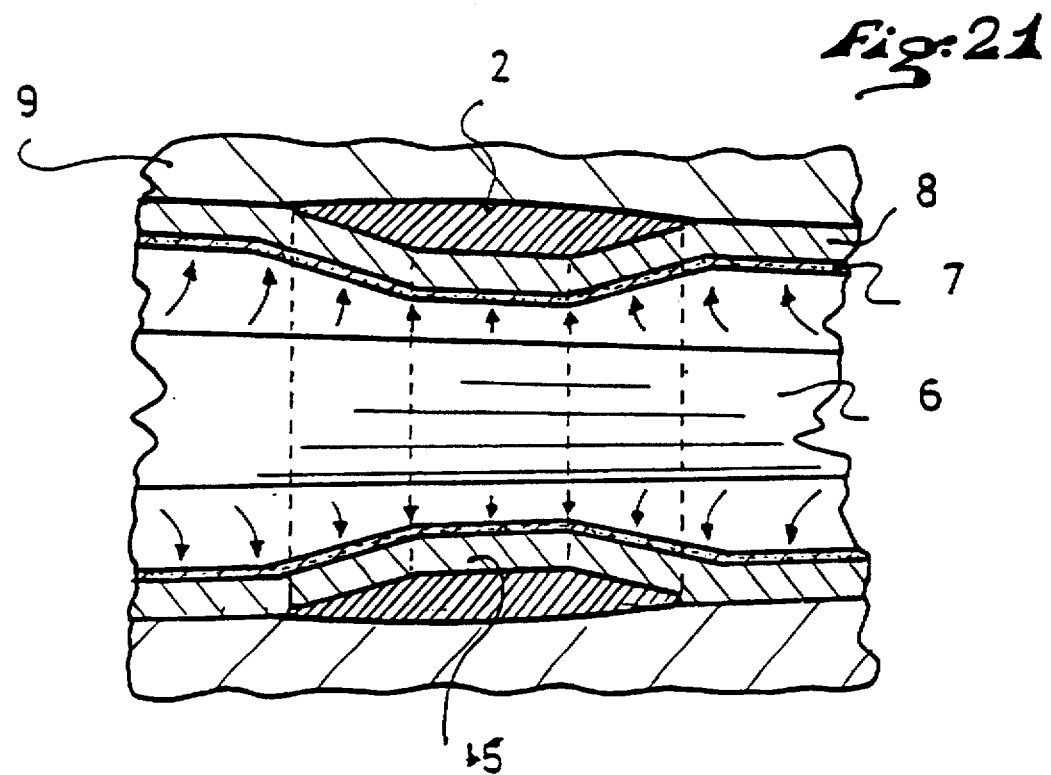

The molding operation is then carried out by heating and by application of a pressurized fluid inside the bladder in order to obtain the formation of the neck portion 15 against the inner surface 214 of the ring and the compaction of the complex 8 against the cavity of the mold outside of the neck portion (FIG. 21).

Finally, a very close connection is obtained between the shaft and the ring due to the fact that it is the composite structure that adapts to the ring configuration by the pressure exerted. The shaping is especially easier due to the inner shape of the ring whose end portions flare out progressively.

The fluid used is generally air that is compressed at about 10–15 bars for a period of time of about 3–4 minutes.

The heating is adapted to activate the cross-linking of the thermohardening resin of the composite. It is on the order of or slightly greater than 150 degrees for a duration that can vary depending upon the type of resin used.

Of course, the invention is not limited to the embodiments described and represented by way of example, but it also includes the technical equivalents as well as the combinations thereof.

What is claimed is:

1. A golf club shaft comprising:

an elongated member having a predetermined length, said elongated member comprising a fiber/resin composite material;

said elongated member having a first end and an opposite second end, said first end having an outer diameter larger than an outer diameter of said second end;

said elongated member comprises, along a part of said predetermined length, a neck, said neck having a reduced diameter area and flared portions extending in respective opposite directions from said reduced diameter area, said flared portions having respective outer surfaces flaring continuously from said reduced diameter area;

a ring extending around said neck, said ring being made of a material, said ring is rigid having a density greater than a density of said composite material; and said ring having a first end portion and a second end portion, each of said first end portion and said second end portion of said ring having inner surfaces in engagement with respective outer surfaces of said flared portions of said neck of said elongated member.

2. A golf club shaft according to claim 1, wherein:

said flared portions of said neck flare gradually to locations at respective opposite ends of said ring.

3. A golf club shaft according to claim 1, wherein:

said neck has an outer surface, including said outer surfaces of said flared portions, complementary in shape to an inner surface of the ring, said inner surface of said ring including said inner surfaces of said first and second end portions of said ring.

4. A golf club shaft according to claim 3, wherein:

said elongated member extends along a longitudinal axis; and said inner surface of each of said end portions of said ring is substantially truncated and forms an angle of inclination with respect to said longitudinal axis, said angle of inclination being between 5 and 25 degrees.

5. A golf club shaft according to claim 3, wherein:

said elongated member extends along a longitudinal axis;

said inner surface of each of said end portions of said ring is substantially truncated and forms an angle of inclination with respect to said longitudinal axis, said angle of inclination is approximately 10 degrees.

6. A golf club shaft according to claim 1, wherein:

each of said end portions of said ring has a length equal approximately to between 0.1 and 0.5 times a total length of said ring.

7. A golf club shaft according to claim 6, wherein:

between said end portions, said ring comprises an intermediate portion, said intermediate portion having a substantially cylindrical shape.

8. A golf club shaft according to claim 6, wherein:

said end portions of said ring are adjacent and together form a curved inner surface of said ring.

9. A golf club shaft according to claim 1, wherein:

said ring further comprises means for affixing said ring against rotation relative to said elongated member.

10. A golf club shaft according to claim 9, wherein:

said means for affixing comprises structures positioned at an inner surface of said ring.

11. A golf club shaft according to claim 10, wherein:

said means for affixing comprises a member selected from the group consisting of serrations, ribs, and pins.

12. A golf club shaft according to claim 1, wherein:

said ring further comprises a series of longitudinally extending and radially spaced flutings extending through a thickness of said ring.

13. A golf club shaft according to claim 1, wherein:

said neck of said elongated member comprises an inner surface and an outer surface, said inner surface and said outer surface defining a substantially constant thickness along a length of said neck, including along said flared portions of said neck.

14. A golf club shaft according to claim 13, wherein:

said ring comprises inner and outer surfaces, said inner and outer surfaces of said ring defining a thickness, said thickness decreasing in opposite longitudinal directions.

15. A golf club shaft according to claim 1, wherein:

said ring comprises inner and outer surfaces, said inner and outer surfaces of said ring defining a thickness, said thickness decreasing in opposite longitudinal directions.

16. A golf club shaft according to claim 1, wherein:

said ring comprises opposite edges at remote ends of said flared portions, said edges being substantially circular.

17. A golf club shaft according to claim 1, wherein:

said ring comprises opposite edges at remote ends of said flared portions, wherein said edges at each end do not lie in a flat plane.

18. A golf club shaft according to claim 1, wherein:

said ring comprises internal peripheral steps for preventing displacement of the ring along said neck.

19. A golf club shaft according to claim 1, wherein:

said ring is comprised of a metallic material.

20. A golf club shaft according to claim 1, wherein:

said ring is made of a material comprising a member selected from the group consisting of steel, bronze, copper, cupro-beryllium, zinc, brass, aluminum, and aluminum alloys.

21. A golf club shaft according to claim 1, wherein:

said shaft comprises a substantially continuous outer surface extending lengthwise from a location immediately adjacent one end of said ring to a location immediately adjacent a second end of said ring.

22. A golf club comprising a shaft according to claim 1 in combination with a head attached to said second end.

23. A golf club shaft according to claim 1, wherein:

said ring is in intimate contact with said composite material at said neck.

24. A process for manufacturing a golf club shaft, whereby the shaft includes an elongated member having a predetermined length, the elongated member comprising a fiber/resin composite material, the elongated member having a first end and an opposite second end, the first end having an outer diameter larger than an outer diameter of the second end, the elongated member further having a neck along a part of the predetermined length, the neck having a reduced diameter area and flared portions extending in respective opposite directions from said reduced diameter area, the flared portions having respective outer surfaces flaring continuously from the reduced diameter area, the shaft further including a ring extending around the neck, the ring being made of a material having a density greater than a density of the composite material, the ring having a first end portion and a second end portion, each of the first and second end portions having an inner surface in engagement with respective outer surfaces of the flared portions of the neck of the elongated member, the process comprising:

positioning a bladder made of an extensible and impervious material on an elongated mandrel;

covering the mandrel with fibers impregnated with a resin so as to obtain a wound fibrous complex;

placing the ring upon the complex;

positioning the complex, provided with the ring, in a mold, the mold having a cavity defining a final shape of the golf club shaft to be manufactured; and performing a molding operation comprising heating and applying a pressurized fluid inside the bladder in order to form the neck of the shaft against inner surfaces of the ring without movement of the ring with respect to the mold and compacting the complex against the mold cavity in areas of the complex longitudinally beyond the neck.

25. A process for manufacturing a golf club shaft, the process comprising:

providing a rigid tubular member having the capability of retaining its shape upon the performance of subsequent molding steps;

positioning said rigid tubular member upon a longitudinally extending complex comprising a fiber and resin prewound structure;

positioning said complex, provided with the rigid tubular member, in a mold having a cavity defining a final shape of the golf club shaft to be manufactured, said rigid tubular member being positioned in a predetermined and final location within the mold;

performing a molding operation comprising heating and applying an internal pressure to deform the complex in a radial outward direction so as to form a neck of the shaft against inner surfaces of the rigid tubular member which remains in said predetermined and final location and so as to form the complex against the mold cavity in areas of the complex longitudinally beyond the neck.

* * * * *